(12) United States Patent
Hosokawa et al.

(10) Patent No.: US 6,747,108 B1
(45) Date of Patent: Jun. 8, 2004

(54) MODIFIED POLYTETRAFLUOROETHYLENE FINE POWDER AND PROCESS FOR PREPARING THE SAME

(75) Inventors: Kazutaka Hosokawa, Settsu (JP); Tatsuro Uchida, Settsu (JP); Shinichi Yano, Settsu (JP); Yoshinori Nanba, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,573

(22) PCT Filed: Jul. 13, 1999

(86) PCT No.: PCT/JP99/03763

§ 371 (c)(1),
(2), (4) Date: Jan. 12, 2001

(87) PCT Pub. No.: WO00/02935

PCT Pub. Date: Jan. 20, 2000

(30) Foreign Application Priority Data

Jul. 13, 1998 (JP) ............................................. 10-197099

(51) Int. Cl.$^7$ ................................................. C08F 2/00
(52) U.S. Cl. ........................ 526/206; 526/247; 526/255
(58) Field of Search ................................ 526/255, 206, 526/247

(56) References Cited

U.S. PATENT DOCUMENTS

| | | | |
|---|---|---|---|
| 3,142,665 A | * | 7/1964 | Cardinal |
| 4,262,101 A | * | 4/1981 | Hartwimmer ................ 526/89 |
| 4,363,900 A | | 12/1982 | Shimizu et al. |
| 4,552,925 A | * | 11/1985 | Nakagawa .................. 525/200 |
| 5,324,785 A | | 6/1994 | Noda et al. |

FOREIGN PATENT DOCUMENTS

| | | |
|---|---|---|
| EP | 0257644 | 3/1988 |
| EP | 0296559 | 12/1988 |
| EP | 0 481 509 A2 | 4/1992 |
| EP | 0764668 A1 | 3/1997 |
| EP | 0789038 A1 | 8/1997 |
| JP | 37-4643 | 8/1950 |
| JP | 4414466 | 6/1969 |
| JP | 5038159 | 12/1975 |
| JP | 5626242 | 6/1981 |
| JP | 57-135 | 1/1982 |
| JP | 63-56532 | 3/1988 |
| JP | 64-1711 | 1/1989 |
| JP | 648022 | 2/1989 |
| JP | 369926 | 11/1991 |
| JP | 4-154842 | 5/1992 |
| JP | 826102 | 3/1996 |
| JP | 9-87334 | 3/1997 |
| JP | 9-202814 | 8/1997 |
| JP | 10-53624 | 2/1998 |

* cited by examiner

Primary Examiner—Bernard Lipman
(74) Attorney, Agent, or Firm—Birch, Stewart, Kolasch & Birch, LLP

(57) ABSTRACT

In the preparation of a modified polytetrafluoroethylene fine powder by polymerizing tetrafluoroethylene in an aqueous medium in the presence of a water soluble fluorine-containing dispersant, a fluoroalkyl vinyl ether is added to a reaction system at latest at a start of a reaction and a copolymerization reaction of the fluoroalkyl vinyl ether with tetrafluoroethylene is initiated, and a chain transfer agent is added to the reaction system after at least 80% of tetrafluoroethylene to be polymerized is consumed. The obtained modified polytetrafluoroethylene fine powder has good molding properties, in particular, extrusion properties, and high heat resistance.

6 Claims, No Drawings

MODIFIED POLYTETRAFLUOROETHYLENE FINE POWDER AND PROCESS FOR PREPARING THE SAME

FIELD OF THE INVENTION

The present invention relates to a process for producing a modified polytetrafluoroethylene fine powder having good molding properties and heat resistance, and a modified polytetrafluoroethylene fine powder produced by such a process.

PRIOR ART

Polymerization processes of polytetrafluoroethylene (PTFE) roughly include two types, that is, suspension polymerization and aqueous dispersion (emulsion) polymerization Granular PTFE obtained by the suspension polymerization is finely pulverized to form a powder (granular resin), and the powder as such or the powder, which is granulated to impart flowability to the powder, is processed mainly by compression molding or ram extrusion molding.

In the case of a latex obtained by the aqueous dispersion (emulsion) polymerization, the polymer fine particles are coagulated and dried to obtain fine powder, and the fine powder is processed by paste extrusion after compounding a liquid lubricant in the fine powder. Alternatively, a surfactant is added to the latex obtained by the polymerization to stabilize the latex, and then the latex is further concentrated and processed by coating or dipping.

Low molecular weight PTFE, which is called "waxes", is often used to modify the properties of other thermoplastic resins, thermosetting resins, coatings, inks, oils, etc. with blending, by making use of the excellent properties of PTFE, for example, lubricity, although the low molecular weight PTFE does not have sufficient mechanical strength for practical applications.

As explained above, the PTFE fine powder is mainly used in a paste extrusion method in which a liquid lubricant is compounded in the PTFE fine powder and the compound is extruded with an extruder in the form of a relatively thin rod or a tube. The extruded articles is rolled to form a film which is used as a sealing material, or further stretched to form a porous film which is used as a filter. Alternatively, the PTFE fine powder is sintered to form a final product in the case of a tube or wire-coatings.

From the industrial point of view, the PTFE fine powder is required to have high productivity in the paste extrusion molding process. The most important factor is a reduction ratio (RR) in the course of extrusion.

The reduction ratio is expressed by a ratio of a cross sectional area (S) of a cylinder in which the powder to be extruded is filled to a cross sectional area (s) of a die outlet (S/s). It is preferable to increase the reduction ratio as much as possible so that a larger amount of the powder is charged in the cylinder and extruded in one extrusion cycle. However, when the reduction ratio exceeds the limit of the processing properties of the powder, a normal extrudate cannot be obtained since the extrudate tends to wave, the surface and/or inside of the extrudate tend to be cracked, or the extrudate tends to be broken in the course of extrusion.

Furthermore, it is important for an extrusion pressure not to increase excessively in the course of paste extrusion from the viewpoint of productivity. If the extrusion can be carried out at the high reduction ratio but the required extrusion pressure is very high, such a high pressure may exceed the capacity of the extruder and thus the it is not preferable in the industry. In addition, the reduction ratio and the extrusion pressure have a deep relationship with an extrusion speed. As the extrusion speed increases, the extrusion pressure increases while the possible reduction ratio decreases.

Under the above circumstances, various techniques have been proposed to improve the paste extrusion properties including the increase of the reduction ratio at which the extrusion is possible and the suppression of the increase of the extrusion pressure.

Among them, the earliest proposal is a polymerization process of tetrafluoroethylene (TFE) disclosed in JP-B-37-4643 (U.S. Pat. No. 3,142,665). This process is characterized in that a modifier is introduced in a polymerization reaction system prior to the consumption of 70% of TFE to be polymerized. Preferred examples of the modifier described are hexafluoropropylene (HFP) which is a comonomer, and methanol, etc.

The introduction of the modifier to PTFE decreases the crystallinity of the produced polymer and suppresses the fibrillation properties specific to PTFE. In general, the extrusion pressure increases as the reduction ratio is high. It is assumed that the extrusion under a high pressure may apply a high shear force on primary particles to accelerate the fibrillation of the particles. As a result, an abnormal flow condition is induced during the extrusion so that defects such as cracks are generated in the extrudate or the sintered extrudate. Thus, the suppression of the fibrillation properties with the introduction of the modifier functions to relieve the extrusion defects at the high reduction ratio caused by the excessive fibrillation.

JP-B-56-26242 discloses a method for improving the paste extrusion properties of PTFE with the introduction of chlorotrifluoroethylene in a reaction system at the start (initiation) of the reaction and when 70 to 90% of TFE is consumed.

JP-A-63-56532 discloses a method for improving the paste extrusion properties and heat resistance of a PTFE fine powder by copolymerizing a fluoroalkyl vinyl ether with TFE in the core part of the particle and copolymerizing chlorotrifluoroethylene (CTFE) in the shell part of the particle to obtain a PTFE fine powder.

Furthermore, JP-B-64-8022 proposes a primary particle having a three-layer structure in which PTFE in the second layer is not modified, while PTFE in the first and third layers is modified.

JP-B-3-69926 and JP-B-8-26102 use a perfluoroalkyl-ethylene as a modifier.

The introduction of a modifier in the PTFE fine powder is sometimes employed to improve properties other than paste extrusion properties. In particular, when a copolymerizable modifier is used, usually the crystallinity of the polymer decreases, and often a sintering rate increases and the transparency and mechanical properties of the polymer increase.

For example, JP-B-50-38159 describes that, when TFE is polymerized using a perfluoroalkyl vinyl ether as a modifier and a persulfate salt initiator, the mechanical properties, in particular, flexural life of the polymer prepared can be significantly improved.

In the meantime, the fine powder for high RR (HRR) extrusion molding is used to coat electric wires or processed in the form of thin tubes, and often used in the fields where high quality is increasingly required such as the fields of aircraft, automobiles, medical equipment, precision machines, etc.

From the viewpoint of processing, not only the HRR extrusion properties which influence the productivity and also the reduction of a sintering time are desired. Therefore, it is necessary to raise a sintering temperature, and the sintering temperature often exceeds 400° C. In general, as the sintering temperature rises, the sintering temperature shortens. However, the polymer tends to be thermally degraded to lead to the deterioration of the mechanical properties such as tensile strength of the final product of the polymer. Thus, the high sintering temperature is not preferable from the practical viewpoint. Therefore, the increase of the heat stability of the polymer is required.

In the applications of the final products, the improvement of long-term heat resistance is desired, since the temperature in the service environment increases, for example, in the case of coated electric wires used in engine rooms.

Hitherto, a thermal instability index (TII; ASTN D4895) is used as a measure of the heat resistance of PTFE.

TII is obtained from a difference of densities of molded articles which are molded with changing a sintering time. In general, the smaller TII means the smaller change of the crystallinity and less heat degradation of the polymer. Therefore, PTFE with the small TII is preferably used in the above applications requiring the heat resistance.

TII of the unmodified PTFE fine powder which is practically used does not exceed 5. However, the modifiers which are conventionally used to improve the HRR extrusion properties sometimes deteriorate the heat resistance of PTFE.

For example, TII of HFP-modified PTFE, which is disclosed in JP-B-37-4643, etc., is usually in the range between 10 and 30. The PTFE fine powder modified with CTFE, which is disclosed in JP-B-56-26242, etc., has good HRR extrusion properties, but tends to have low heat stability. TII of the CTFE-modified PTFE is usually from 30 to 50.

For the purpose of the improvement of heat resistance of the CTFE-modified PTFE fine powder, TII can be adjusted to about 4 to about 25 with the use of a fluorovinyl ether as a modifier in a particle core and CTFE as a modifier in a particle shell (JP-A-63-56532).

Furthermore, TII of a perfluoroalkylethylene-modified PTFE fine powder (JP-B-3-69926 and JP-B-8-26102) and a perluforoalkylethylene-HFP-modified PTFE fine powder (JP-A-9-87334) is usually from 10 to 20.

In most cases, TII of such modified PTFE fine powders is larger than that of the unmodified PTFE fine powder. In addition, the modified PTFE fine powders have practically insufficient heat resistance such that the tensile strength of the molded articles decreases in sintering at a high temperature or after the long-term use in a high temperature atmosphere. Thus, the improvement of the heat resistance of the modified PTFE fine powders is desired.

TII of a PTFE fine powder modified with a fluorovinyl ether (for example, JP-B-50-38159, JP-A-64-1711, etc.) is mostly 0 (zero), and such a modified PTFE fine powder has good practical heat resistance, but insufficient HRR extrusion properties. Thus the improvement of the HRR extrusion properties is desired.

SUMMARY OF THE INVENTION

One object of the present invention is to provide a PTFE fine powder which removes the defects of the known PTFE fine powders described above and has good HRR extrusion properties and also good heat resistance, and a process for preparing such a PTFE fine powder.

According to the first aspect of the present invention, there is provided a process for preparing a modified PTFE fine powder comprising the step of copolymerizing TFE and a fluoroalkyl vinyl ether in an aqueous medium in the presence of a water soluble fluorine-containing dispersant, wherein at least one fluoroalkyl vinyl ether selected from the group consisting of a compound of the formula:

$$X(CF_2)_nOCF=CF_2 \quad (I)$$

wherein X is a hydrogen atom, a fluorine atom or a chlorine atom, and n is an integer of 1 to 6, and a compound of the formula:

$$C_3F_7(OCF_2CF_2CF_2)_m[OCF(CF_3)CF_2]_kOCF=CF_2 \quad (II)$$

wherein m and k are independently an integer of 0 to 4, provided that the sum of m and k is not 0 (zero) is added to a reaction system at latest at a start of a reaction and a copolymerization reaction of the fluoroalkyl vinyl ether with TFE is initiated, and a chain transfer agent is added to the reaction system after at least 80% of TFE to be polymerized is consumed.

According to the second aspect of the present invention, there is provided a PTFE fine powder wherein a content of at least one fluoroalkyl vinyl ether described above is from 0.02 to 0.3 wt. %, an average particle size of primary particles is from 0.1 to 0.5 μm, a standard specific gravity (SSG) is from 2.150 to 2.190, and TII is 3 or less.

DETAILED DESCRIPTION OF THE INVENTION

The modified PTFE fine powder of the present invention may be prepared by an aqueous dispersion polymerization method. That is, the polymerization reaction is carried out using a polymerization initiator in an aqueous medium in the presence of an water-soluble fluorine-containing dispersant while stirring.

Examples of the water-soluble fluorine-containing dispersant include a compound of the general formula:

$$Z(CF_2)_aCOOH$$

wherein Z is a hydrogen atom or a fluorine atom, and a is an integer of 6 to 10, a compound of the general formula:

$$Cl(CF_2CFCl)_bCF_2COOH$$

wherein b is an integer of 2 to 6, a compound of the general formula:

$$(CF_3)_2CF(CF_2CF_2)_cCOOH$$

wherein c is an integer of 2 to 6, a compound of the general formula:

$$F(CF_2)_dO(CFRCF_2O)_eCFRCOOH$$

wherein R is a fluorine atom or a trifluoromethyl group, d is an integer of 1 to 5, and e is an integer of 1 to 5, and their ammonium salts or alkali metal salts (e.g. potassium salts, sodium salts).

In particular, it is preferable to use a salt of the formula:

$$C_fF_{2f+1}COOR'$$

or $$C_3F_7O[CF(CF_3)CF_2O]_gCF(CF_3)COOR'$$

wherein f is an integer of 6 to 9, g is 1 or 2, and R' is an ammonium group or an alkali metal atom.

The water-soluble fluorine-containing dispersant can be charged in the polymerization reaction system by various methods. For example, the water-soluble fluorine-containing dispersant may be charged into a polymerization reaction system prior to the start of a reaction all at once, while it is possible to carry out a programmed charging to control the particle size, as described in JP-B-44-14466.

The amount of the water-soluble fluorine-containing dispersant is from 0.02 to 0.3 wt. % based on the weight of an aqueous medium used, although it depends on the kind of the dispersant and the intended primary particle size.

If necessary, a hydrocarbon having 12 or more carbon atoms, which is substantially inactive against the reaction and is in a liquid state under the polymerization conditions, may be used as a dispersion stabilizer for a polymerization system in an amount of 2 to 10 wt. parts per 100 wt. parts of the aqueous medium.

Furthermore, a buffer such as ammonium carbonate, ammonium phosphate, etc. may be added to adjust a pH value in the course of the reaction.

A polymerization initiator may be any one that is used in the conventional polymerization methods of TFE. Examples of the polymerization initiator include persulfates such as ammonium persulfate, potassium persulfate, etc., water-soluble organic peroxides such as disuccinic acid peroxide, diglutaric acid peroxide, etc., and their mixtures.

The amount of the polymerization initiator may be suitably selected according to a polymerization temperature and intended SSG.

A polymerization temperature may be selected from a wide range between 10 and 95° C. When the persulfates or water-soluble organic peroxides are used, a polymerization temperature is preferably from 60 to 90° C., since a high reaction rate can be achieved with a relatively small amount of the initiator, and SSG can be easily adjusted. When a polymerization is carried out at a low temperature of 40° C. or less, reducing agents such as sulfites, acidic sulfites, etc. may be used in combination with the persulfates to form a redox system.

The fluoroalkyl vinyl ether used as the modifier is preferably present in the reaction system from the initiation of the reaction. Thus, all the necessary amount of the fluoroalkyl vinyl ether is charged in the reaction system at once before the start of the reaction, or a part of the fluoroalkyl vinyl ether is charged in the reaction system before the start of the reaction and the remaining amount of the fluoroalkyl vinyl ether is additionally charged to the reaction system portion by portion or continuously, since the final shape of the primary particle is greatly influenced by the particle shape formed in the initial stage of the reaction and thus the modifier should be present in the reaction system from the start of the reaction.

The content of the fluoroalkyl vinyl ether in the polymer of the present invention is preferably from 0.02 to 0.3 wt. %. When the content of the modifier is too low, the modification effects are insufficient. When the content of the modifier is too high, the reaction rate decreases so that the productivity deteriorates. More preferably, the content of the fluoroalkyl vinyl ether is from 0.03 to 0.2 wt. %.

One of the characteristics of the present invention is that, in the course of the copolymerization of TFE and the fluoroalkyl vinyl ether, a chain transfer agent is added to the reaction system when at least 80%, preferably 80 to 97%, more preferably 85 to 95% of TFE to be consumed by the reaction is reacted.

The purpose of the addition of the chain transfer agent is to lower the molecular weight of only the outer layer of the formed particle, that is, the shell, so as to suppress the fibrillation properties specific to PTFE and improve the HRR extrusion properties. In general, when the molecular weight of PTFE decreases to a certain level, its mechanical properties tend to deteriorate. According to the present invention, the modified PTFE fine powder having the properties can cope with the practical application without the influence of the chain transfer agent since the timing of the charging of the chain transfer agent is specifically selected.

When the timing of the charging of the chain transfer agent is too early, the period in which the polymerization rate decreases due to the chain transfer reaction increases so that the productivity decreases. From the viewpoint of the properties of the produced polymer, the part having the low molecular weight increases so that the mechanical properties and heat resistance of the fine powder as a whole deteriorate. When the timing of the charging of the chain transfer agent is too late, the effect to suppress the fibrillation is not sufficiently achieved and the satisfactory HRR extrusion properties are not attained.

Examples of the chain transfer agents used include hydrogen; hydrocarbons such as methane, ethane, propane, butane, etc.; halohydrocarbons such as $CH_2CF_2$, $CH_3Cl$, $CH_2Cl_2$, $C_2H_3Cl_2F$, etc.; and water-soluble organic compounds such as methanol, ethanol, etc.

The polymerization reaction proceeds at a pressure of 0.5 to 3.9 MPa, preferably 0.9 to 3.0 MPa, which is generaged by an autogenous pressure of TFE.

The polymerization reaction is terminated by stopping stirring and discharging the monomers outside the reaction system, when the concentration of the formed polymer latex reaches 20 to 45 wt. %.

The polymer produced can be coagulated by diluting the polymer latex with water to a polymer concentration of 10 to 20 wt. % and then agitating the diluted latex in a vessel equipped with an agitator more vigorously than in the polymerization reaction. The agitation may be carried out with the adjustment of pH or with the addition of coagulation aids such as water-soluble organic compounds (e.g. methanol, acetone, etc.), inorganic salts (e.g. potassium nitrate, sodium nitrate, ammonium carbonate, sodium carbonate, etc.), inorganic acids (e.g. hydrochloric acid, sulfuric acid, nitric acid, etc.), and the like. Alternatively, the coagulation can continuously be carried out with an in-line mixer, and the like.

Prior to or during the coagulation, pigments which color the polymer, or fillers which impart conductivity or improve the mechanical properties may be added to the latex.

The wet powders obtained by coagulation may be dried with heating means such as hot air, which may be combined with reduced pressure or vacuum, while maintaining the powder in a state in which the powder does not unnecessarily flow. The drying temperature is lower than the melting point of the polymer, and is preferably from 100 to 250° C.

The paste extrusion properties may be influenced by the drying conditions. The paste extrusion pressure increases as the drying temperature increases. The friction of particles, in particular, at a high temperature will have undesirable influences on the PTFE fine powder, because the particles of the PTFE fine powder are easily fibrillated even with a small shear force and thus they lose the original particulate structure, which leads to the deterioration of the paste extrusion properties.

EXAMPLES

The present invention will be illustrated by the following Examples.

In the Examples, the polymer latices and PTFE fine powders are analyzed and tested as follows:

1) Polymer Concentration

Ten grams of a polymer latex were sampled on a laboratory dish, and dried at 150° C. for about 3 hours to evaporate the medium to dryness. The residual solid was weighed, and then a polymer concentration is calculated from the latex weight and the solid weight.

2) Number Average Particle Size

A calibration curve is prepared using various polymer samples. That is, the transmittance of an incident light of 550 nm per a unit path length of a polymer latex, which has been diluted with water to a solid content of 0.15 wt. %, is measured, and also a number-based length average particle size is determined by measuring diameters of particles in a certain direction with a transmission electron microscope. Then, a calibration curve is drawn using the light transmission and the average particle size.

The average particle size of a specific sample is read from the calibration curve using a transmittance which is measured with the certain sample under the same conditions as above.

3) Content of a Modifier

As the content of a fluoroalkyl vinyl ether in a polymer, a value (wt. %) is used, which is obtained by multiply a ratio of an absorption intensity at 995 $cm^{-1}$ to that at 935 $cm^{-1}$ in an IR absorption band, by 0.14.

4) Standard Specific Gravity (SSG)

SSG is measured by a water-replacement method using a sample which is prepared according to ASTM D4895-89.

5) Thermal Instability Index (TII)

TII is measured according to ASTM D4895-89.

6) Paste Extrusion Test (RR 1500)

A PTFE fine powder (50 g) and a hydrocarbon oil (ISOPAR E manufactured by Exxon Chemical Co., Ltd.) (9.2 g) as an extrusion aid are mixed in a glass bottle and aged at room temperature (25±2° C.) for one hour. Then, the mixture is charged in an extrusion die having a reduction angle of 30 degrees and an orifice of 0.57 mm in inner diameter and 1.95 mm in land-length at its lower end, which die is equipped with a cylinder having an inner diameter of 25.4 mm. Then, a load of 1.2 MPa is applied to a piston inserted in the cylinder, and maintained for one minute. Immediately after that, the above mixture is extruded through the orifice at room temperature at a ram speed of 20 mm/min. to obtain a rod. A pressure in an interval in which the pressure is equilibrated in the latter extrusion period is divided by the cross sectional area of the cylinder is used as an extrusion pressure.

7) Appearance of an Extrudate

The appearance of the extrudate obtained in the above paste extrusion test is visually observed and ranked according to the following criteria:

A: A continuous extrudate is obtained and it is not waved.

B: A continuous extrudate is obtained but it is slightly waved.

C: A continuous extrudate is obtained but it is considerably waved.

D: No continuous extrudate is obtained.

Example 1

In a 6 liter stainless-steel (SUS 316) autoclave equipped with stainless-steel (SUS 316) anchor type agitation blades and a temperature-regulating jacket, deionized water (2960 ml), liquid paraffin (a first class grade reagent, manufactured by KISHIDA Chemical Co., Ltd.) (120 g) and ammonium perfluorooctanoate (0.6 g) were charged, and the internal atmosphere was replaced with nitrogen gas three times and with TFE gas two times while maintaining the autoclave at 70° C. to purge oxygen. Then, the internal pressure was raised to 1.52 MPa with the TFE gas and the mixture was stirred at 280 rpm while maintaining the internal temperature at 70° C.

After that, perfluoropropyl vinyl ether (PPVE) (2.5 g) and then the solution of ammonium persulfate (11.25 mg) dissolved in pure water (20 g) and the solution of disuccinic acid peroxide (270 mg) dissolved in pure water (20 g) were charged under the pressure of TFE to raise the internal pressure of the autoclave to 1.57 MPa. Thus, the reaction acceleratingly proceeded, but the reaction temperature was maintained at 70° C. and the stirring rate was kept at 280 rpm. TFE was continuously supplied to maintain the internal pressure of the autoclave at 1.57±0.05MPa.

When the amount of TFE consumed reached 150 g during the reaction, ammonium perfluorooctanoate (2.4 g) was additionally charged. When the amount of TFE consumed reached 1,200 g, ethane gas (80 ml) was supplied under the pressure of TFE. TFE was still continuously supplied.

When 1,500 g of TFE was consumed, the reaction was terminated by stopping stirring and the supply of the monomer, and immediately discharging the gas in the autoclave down to an atmospheric pressure.

The total reaction time was 12.8 hours and the polymer concentration of the obtained latex was 32.8 wt. %. The number average particle size was 0.23 µm.

The obtained latex was coagulated, and the coagulated polymer was washed. Then, the polymer powder was dried at 150° C. for 16 hours. With the obtained fine powder, a PPVE content in the polymer was measured, and it was 0.112 wt. %. The polymer had a SSG of 2.183 and TII of 0, and exhibited good heat resistance.

The paste extrusion pressure at a RR of 1500 was 81.3 MPa and the appearance of the extrudate was good. Thus, the polymer powder had good extrusion properties.

Example 2

The polymerization reaction was carried out in the same manner as in Example 1 except that the timing of the charging of the chain transfer agent was changed. The reaction conditions and the properties are shown in Table 1. All the polymers had good heat resistance and extrusion properties.

Example 5

The polymerization reaction was carried out in the same manner as in Example 3 except that the reaction pressure and the kind and amount of the chain transfer agent were changed. The polymer obtained had good heat resistance and extrusion properties.

Example 6

The polymerization reaction was carried out in the same manner as in Example 3 except that the reaction temperature and the-amounts of the polymerization initiators and PPVE were changed. The polymer obtained had good heat resistance and extrusion properties.

Example 7

The polymerization reaction was carried out in the same manner as in Example 2 except that the amounts of the polymerization initiators and the chain transfer agent were changed. The polymer obtained had good heat resistance and extrusion properties.

had TTI of 0 and exhibited good heat resistance, but the paste extrusion pressure at a RR of 1,500 was high. Thus, no

TABLE 1

| Item (unit) | Example No. | | | | | | |
|---|---|---|---|---|---|---|---|
| | 1 | 2 | 3 | 4 | 5 | 6 | 7 |
| Reaction pressure (MPa) | 1.57 | 1.57 | 1.57 | 1.57 | 1.08 | 1.57 | 1.57 |
| Reaction temp. (° C.) | 70 | 70 | 70 | 70 | 70 | 85 | 70 |
| APS (mg) | 11.25 | 11.25 | 11.25 | 11.25 | 11.25 | 12.3 | 18.0 |
| DSP (mg) | 270 | 270 | 270 | 270 | 270 | 180 | 0 |
| PPVE (g) | 2.5 | 2.5 | 2.5 | 2.5 | 2.5 | 1.5 | 2.5 |
| TFE amount consumed prior to charge of chain transfer agent (g) | 1200 | 1275 | 1350 | 1425 | 1350 | 1350 | 1350 |
| Total amount of TFE consumed (g) | 1500 | 1500 | 1500 | 1500 | 1500 | 1500 | 1500 |
| Timing of charging chain transfer agent (%) | 80 | 85 | 90 | 95 | 90 | 90 | 85 |
| Chain transfer agent | Ethane | Ethane | Ethane | Ethane | Methanol | Ethane | Ethane |
| Amount of chain transfer agent (g) | 0.11 | 0.11 | 0.11 | 0.11 | 0.16 | 0.11 | 0.16 |
| Reaction time (hrs) | 12.9 | 12.0 | 11.3 | 10.6 | 21.0 | 13.6 | 9.8 |
| Polymer concentration (wt. %) | 33.2 | 32.6 | 33.1 | 32.9 | 32.9 | 33.7 | 33.4 |
| Number average particle size ($\mu$m) | 0.23 | 0.23 | 0.24 | 0.24 | 0.24 | 0.25 | 0.22 |
| PPVE content (wt. %) | 0.112 | 0.106 | 0.103 | 0.108 | 0.098 | 0.056 | 0.125 |
| SSG | 2.183 | 2.177 | 2.169 | 2.166 | 2.170 | 2.180 | 2.163 |
| TII | 0 | 0 | 0 | 0 | 0 | 0 | 0 |
| RR 1500 | | | | | | | |
| Extrusion pressure (MPa) | 81.3 | 67.2 | 71.3 | 82.0 | 70.0 | 65.7 | 92.6 |
| Appearance of extrudate | B | A | A | B | A | A | B |

After that, PPVE (0.8 g) and then the solution of ammonium persulfate (11.25 mg) dissolved in pure water (20 g) and the solution of disuccinic acid peroxide (270 mg) dissolved in pure water (20 g) were charged under the pressure of TFE to raise the internal pressure of the autoclave to 1.08 MPa. The reaction acceleratingly proceeded, but the reaction temperature was maintained at 70° C., and the stirring rate was kept at 280 rpm. TFE was continuously supplied to maintain the internal pressure of the autoclave at 1.08±0.05 MPa.

When the amount of TFE consumed reached 1,365 g, CTFE (3.0 g) was charged under the pressure of TFE. TFE was still continuously supplied.

The reaction was terminated by stopping the stirring and supply of the monomer, and immediately discharging the gas in the autoclave down to an atmospheric pressure, when 1,500 g of the TFE monomer was consumed.

The total reaction time was 17.6 hours, the polymer content of the obtained latex was 32.8 wt. %, and the number average particle size was 0.22 $\mu$m.

The obtained latex was post-processed in the same manners as in Example 1. With the fine powder obtained, a PPVE content in the polymer was measured, and it was 0.037 wt. %. The content of CTFE was 0.129 wt. &, and the polymer had a SSG of 2.178.

In the extrusion test at a RR of 1,500, the polymer exhibited good extrusion properties, but it had TII of 6 and low heat resistance.

As the content (wt. %) of CTFE in the polymer, a value was used, which was obtained by multiplying a ratio of the absorption Comparative Example 1

The polymerization reaction was carried out in the same manner as in Example 1 except that the reaction pressure and the amounts of the initiator and PPVE were changed, and no chain transfer agent was charged. The obtained fine powder continuous extrudate could be obtained. That is, the obtained fine powder had low extrusion properties.

Comparative Example 2

The reaction was carried out in the same manner as in Example 1 except that the chain transfer was charged when 75% of TFE was consumed. The obtained fine powder had a TII of 0 (zero) and good heat resistance, but the paste extrusion pressure at a RR of 1,500. A continuous extrudate was obtained but it greatly waved. Thus, its extrusion properties were very low.

Comparative Example 3

The following experiment was carried out according to the method described in JP-A-63-56532 (JP-B-4-3765).

In the same autoclave as that used in Example 1, deionized water (2,960 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 70° C. to purge oxygen. Then, the internal pressure was raised to 1.03 MPa with the TFE gas. The mixture was stirred at 280 rpm, and the internal temperature was maintained at 70° C. intensity at 2,360 $cm^{-1}$ to that at 957 $cm^{-1}$ in an IR absorption band of the polymer, by 0.58.

TABLE 2

| Item | Com. Example No. | | |
|---|---|---|---|
| (unit) | 1 | 2 | 3 |
| Reaction pressure (MPa) | 2.74 | 1.57 | 10.8 |
| Reaction temp. (° C.) | 70 | 70 | 70 |
| APS (mg) | 30 | 11.25 | 11.25 |
| DSP (mg) | 0 | 270 | 270 |

TABLE 2-continued

| Item (unit) | Com. Example No. | | |
|---|---|---|---|
| | 1 | 2 | 3 |
| PPVE (g) | 5.0 | 2.5 | 0.8 |
| TFE amount consumed prior to charge of chain transfer agent (g) | — | 1125 | 1365 |
| Total amount of TFE consumed (g) | 1500 | 1500 | 1500 |
| Timing of charging additive (%) | — | 75 | 91 |
| Additive | — | Methanol | CTFE |
| Amount of additive (g) | — | 0.16 | 3.0 |
| Reaction time (hrs) | 2.1 | 14.8 | 17.6 |
| Polymer concentration (wt. %) | 32.1 | 32.9 | 32.8 |
| Number average particle size (μm) | 0.21 | 0.23 | 0.22 |
| PPVE content (wt. %) | 0.127 | 0.104 | 0.037 |
| CTFE content (wt. %) | — | — | 0.129 |
| SSG | 2.149 | 2.188 | 2.178 |
| TII | 0 | 0 | 7 |
| RR 1500 Extrusion pressure (MPa) | 121 | 90.2 | 74.9 |
| Appearance of extrudate | D | C | A |

What is claimed is:

1. A process for preparing a modified polytetrafluoroethylene fine powder comprising the step of copolymerizing tetrafluoroethylene and a fluoroalkyl vinyl ether in an aqueous medium in the presence of a water soluble fluorine-containing dispersant, wherein at least one fluoroalkyl vinyl ether selected from the group consisting of a compound of the formula:

$$X(CF_2)_nOCF=CF_2 \quad (I)$$

wherein X is a hydrogen atom, a fluorine atom or a chlorine atom, and n is an integer of 1 to 6, and a compound of the formula:

$$C_3F_7(OCF_2CF_2CF_2)_m[OCF(CF_3)CF_2]_kOCF=CF_2 \quad (II)$$

wherein m and k are independently an integer of 0 to 4, provided that the sum of m and k is not 0 is added to a reaction system at latest at a start of a reaction and a copolymerization reaction of said fluoroalkyl vinyl ether with tetrafluoroethylene is initiated, and after copolymerization is initiated, chain transfer agent is added to the reaction system, but no chain transfer agent is added to the reaction system until at least 80% of tetrafluoroethylene to be polymerized is consumed.

2. The process according to claim 1, wherein after copolymerization is initiated, chain transfer agent is added to the reaction system, but said chain transfer agent is not until after 85 to 95% of tetrafluoroethylene to be polymerized is consumed.

3. The process of claim 1, wherein the chain transfer agent is selected from the group consisting of hydrogen, hydrocarbons, halohydrocarbons and water soluble organic compounds.

4. The process of claim 3, wherein the hydrocarbon is selected from the group consisting of methane, ethane, propane and butane.

5. The process of claim 3, wherein the halohydrocarbon is selected from the group consisting of $CH_2CF_2$, $CH_3Cl$, $CH_2Cl_2$ and $C_2H_3Cl_2F$.

6. The process of claim 3, wherein the water soluble organic compounds are selected from the group consisting of methanol and ethanol.

* * * * *